United States Patent
Peringassery Krishnan et al.

(10) Patent No.: US 12,452,462 B2
(45) Date of Patent: Oct. 21, 2025

(54) SYSTEMS AND METHODS INCLUDING SYNTAX DESIGN FOR MULTI-SYMBOL ARITHMETIC CODING

(71) Applicant: TENCENT AMERICA LLC, Palo Alto, CA (US)

(72) Inventors: Madhu Peringassery Krishnan, Mountain View, CA (US); Liang Zhao, Sunnyvale, CA (US); Xin Zhao, San Jose, CA (US); Jing Ye, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 245 days.

(21) Appl. No.: 17/983,876

(22) Filed: Nov. 9, 2022

(65) Prior Publication Data
US 2024/0015331 A1    Jan. 11, 2024

Related U.S. Application Data

(60) Provisional application No. 63/358,309, filed on Jul. 5, 2022.

(51) Int. Cl.
*H04N 19/70* (2014.01)
*H04N 19/13* (2014.01)
(Continued)

(52) U.S. Cl.
CPC ............. *H04N 19/70* (2014.11); *H04N 19/13* (2014.11); *H04N 19/139* (2014.11);
(Continued)

(58) Field of Classification Search
CPC ...... H04N 19/70; H04N 19/13; H04N 19/139; H04N 19/157; H04N 19/176; H04N 19/186; H04N 19/30; H04N 19/52
See application file for complete search history.

(56) References Cited

U.S. PATENT DOCUMENTS

| | | |
|---|---|---|
| 2013/0027230 A1 | 1/2013 | Marpe et al. |
| 2021/0160524 A1 | 5/2021 | Merkle et al. |

(Continued)

OTHER PUBLICATIONS

International Search Report dated Mar. 8, 2023, issued in International Application No. PCT/US2022/049781.
(Continued)

*Primary Examiner* — Jae N Noh
(74) *Attorney, Agent, or Firm* — Sughrue Mion, PLLC

(57) ABSTRACT

Systems and methods for encoding and decoding using syntax design for multi-symbol arithmetic coding are provided. A method includes receiving a coded video bitstream including a plurality of syntax elements; determining a first maximum alphabet size for arithmetic coding by an arithmetic coding engine, the first maximum alphabet size determined based on a hardware constraint; determining a second maximum alphabet size that is less than the first maximum alphabet size; and decoding the plurality of syntax elements included in the coded video bitstream, based on the determined second maximum alphabet size, wherein each of the plurality of syntax elements is entropy coded with an alphabet size less than or equal to the determined second maximum alphabet size.

20 Claims, 9 Drawing Sheets

(51) Int. Cl.
*H04N 19/139* (2014.01)
*H04N 19/157* (2014.01)
*H04N 19/176* (2014.01)
*H04N 19/186* (2014.01)
*H04N 19/30* (2014.01)
*H04N 19/52* (2014.01)

(52) U.S. Cl.
CPC ......... *H04N 19/157* (2014.11); *H04N 19/176* (2014.11); *H04N 19/186* (2014.11); *H04N 19/30* (2014.11); *H04N 19/52* (2014.11)

(56) References Cited

U.S. PATENT DOCUMENTS

2021/0368176 A1* 11/2021 Bross .................. H04N 19/46
2022/0124376 A1*  4/2022 Said .................... H04N 19/44

OTHER PUBLICATIONS

Written Opinion dated Mar. 8, 2023, issued in International Application No. PCT/US2022/049781.

\* cited by examiner

530

SYSTEMS AND METHODS INCLUDING SYNTAX DESIGN FOR MULTI-SYMBOL ARITHMETIC CODING

CROSS-REFERENCE TO THE RELATED APPLICATION

This application claims priority from U.S. Provisional Application No. 63/358,309, filed on Jul. 5, 2022, the disclosure of which is incorporated herein by reference in its entirety.

FIELD

Embodiments of the present disclosure relate to advanced video coding technologies, and more particularly to syntax design for multi-symbol arithmetic coding.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

SUMMARY

According to embodiments, a method performed by a decoder is provided. The method includes: receiving a coded video bitstream including a plurality of syntax elements; determining a first maximum alphabet size for arithmetic coding by an arithmetic coding engine, the first maximum alphabet size determined based on a hardware constraint; determining a second maximum alphabet size that is less than the first maximum alphabet size; and decoding the plurality of syntax elements included in the coded video bitstream, based on the determined second maximum alphabet size, wherein each of the plurality of syntax elements is entropy coded with an alphabet size less than or equal to the determined second maximum alphabet size.

According to one or more embodiments, the second maximum alphabet size is an integer value between 2 and 15, inclusive.

According to one or more embodiments, the plurality of syntax elements includes a first syntax element that is a set index that indicates which of sets a selected one of symbols is in, and a second syntax element that is an index that indicates which symbol in a selected one of the sets is used for encoding or decoding.

According to one or more embodiments, the symbols are classes of a motion vector difference, and an alphabet size of the first syntax element is 2, and a total number of the classes of the motion vector difference within each of the sets is 3 and 8, respectively.

According to one or more embodiments, the symbols are classes of a motion vector difference, and an alphabet size of the first syntax element is 3, and a total number of the classes of the motion vector difference within each of the sets is 3, 4, and 4, respectively.

According to one or more embodiments, the symbols each indicate an absolute value of a scaling parameter for a chroma from luma (CfL) mode.

According to one or more embodiments, the symbols are each a mode of luma intra mode coding.

According to one or more embodiments, the symbols are each a mode of chroma intra mode coding.

According to one or more embodiments, the symbols are each a wedgelet pattern.

According to one or more embodiments, the symbols are each an end of block (eob) value.

According to embodiments, a system is provided. The system includes: at least one memory configured to store computer program code; and at least one processor configured to receive a coded video bitstream including a plurality of syntax elements, access the computer program code and operate as instructed by the computer program code. The computer program code including: first determining code configured to cause the at least one processor to determine a first maximum alphabet size for arithmetic coding by an arithmetic coding engine, the first maximum alphabet size determined based on a hardware constraint; second determining code configured to cause the at least one processor to determine a second maximum alphabet size that is less than the first maximum alphabet size; and decoding code configured to cause the at least one processor to decode the plurality of syntax elements included in the coded video bitstream, based on the determined second maximum alphabet size, wherein each of the plurality of syntax elements is entropy coded with an alphabet size less than or equal to the determined second maximum alphabet size.

According to one or more embodiments, the second maximum alphabet size is an integer value between 2 and 15, inclusive.

According to one or more embodiments, the plurality of syntax elements includes a first syntax element that is a set index that indicates which of sets a selected one of symbols is in, and a second syntax element that is an index that indicates which symbol in a selected one of the sets is used for encoding or decoding.

According to one or more embodiments, the symbols are classes of a motion vector difference, and an alphabet size of the first syntax element is 2, and a total number of the classes of the motion vector difference within each of the sets is 3 and 8, respectively.

According to one or more embodiments, the symbols are classes of a motion vector difference, and an alphabet size of the first syntax element is 3, and a total number of the classes of the motion vector difference within each of the sets is 3, 4, and 4, respectively.

According to one or more embodiments, the symbols each indicate an absolute value of a scaling parameter for a chroma from luma (CfL) mode.

According to one or more embodiments, the symbols are each a mode of luma intra mode coding.

According to one or more embodiments, the symbols are each a mode of chroma intra mode coding.

According to one or more embodiments, the symbols are each a wedgelet pattern.

According to embodiments, a non-transitory computer-readable medium storing computer code is provided. The computer code is configured to, when executed by at least one processor, cause the at least one processor to implement a decoder that: receives a coded video bitstream including a plurality of syntax elements; determines a first maximum alphabet size for arithmetic coding by an arithmetic coding engine, the first maximum alphabet size determined based on a hardware constraint; determines a second maximum alphabet size that is less than the first maximum alphabet size; and decodes the plurality of syntax elements included in the coded video bitstream, based on the determined second maximum alphabet size, wherein each of the plurality of syntax elements is entropy coded with an alphabet size less than or equal to the determined second maximum alphabet size.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. It is understood that software and hardware may be designed to implement the systems and/or methods based on the description herein.

The features described below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of A and B" or "at least one of A or B" are to be understood as including only A, only B, or both A and B.

Figure 1:
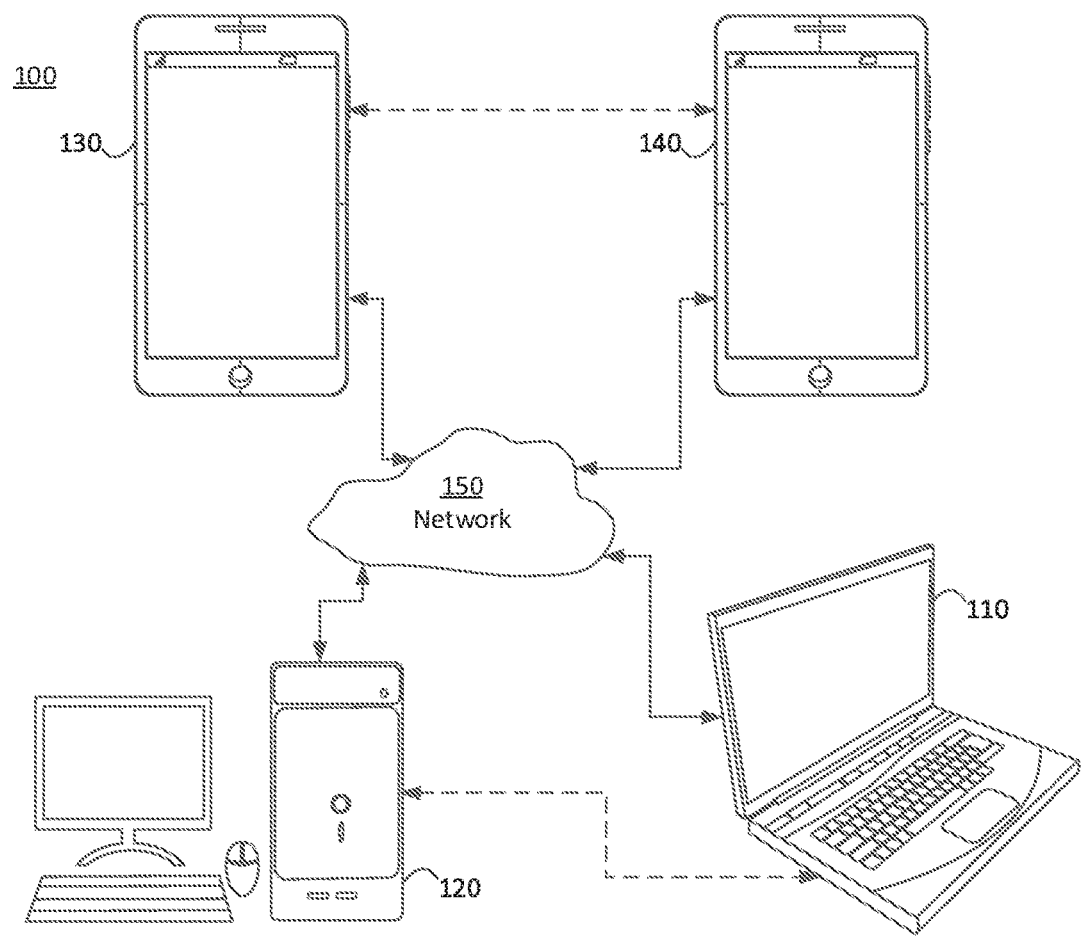
FIG. 1 is a schematic illustration of a simplified block diagram of a communication system in accordance with an embodiment.

FIG. 1 illustrates a simplified block diagram of a communication system 100 according to an embodiment of the present disclosure. The communication system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data, and may display the recovered video data at a local display device.

In FIG. 1, the terminals 110-140 may be illustrated as servers, personal computers, and smart phones, and/or any other type of terminal. For example, the terminals 110-140 may be laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
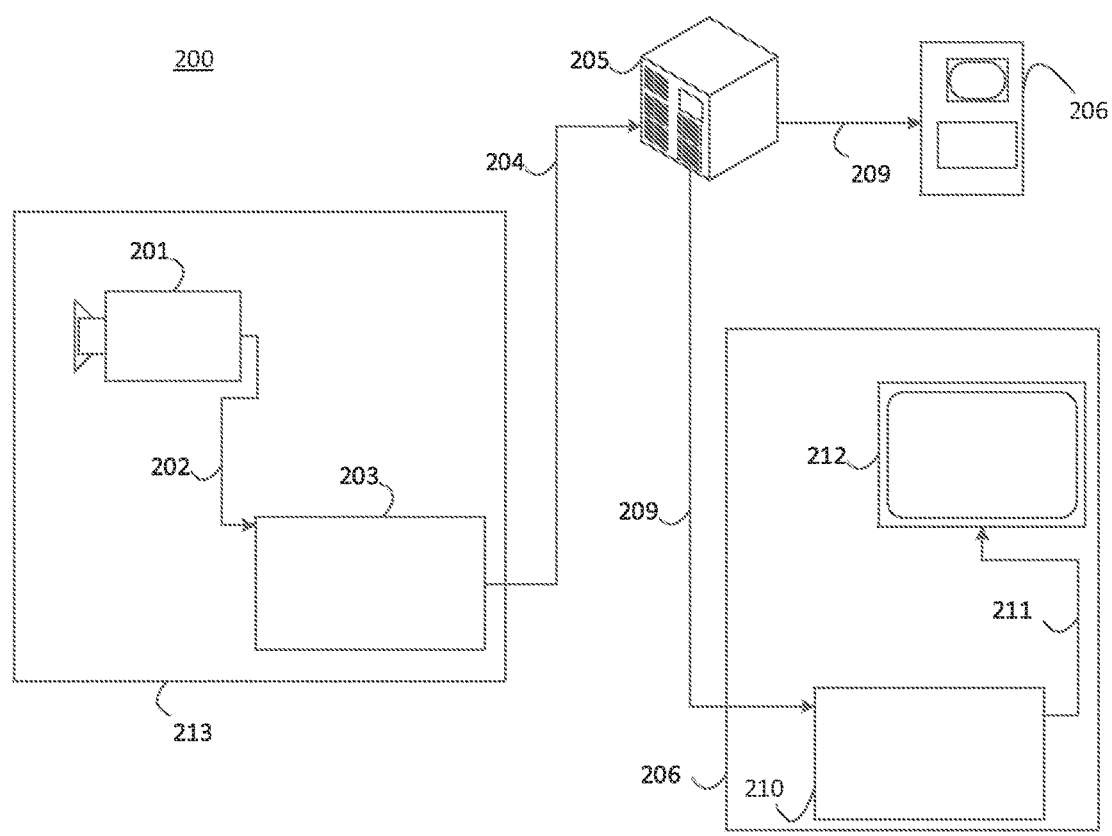
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that can include a video source 201 and an encoder 203. The video source 201 may be, for example, a digital camera, and may be configured to create an uncompressed video sample stream 202. The uncompressed video sample stream 202 may provide a high data volume when compared to encoded video bitstreams, and can be processed by the encoder 203 coupled to the video source 201. The encoder 203 can include hardware, software, or a combination thereof to enable or implement aspects of the disclosed subject matter as described in more detail below. The encoded video bitstream 204 may include a lower data volume when compared to the sample stream, and can be stored on a streaming server 205 for future use. One or more streaming clients 206 can access the streaming server 205 to retrieve video bitstreams 209 that may be copies of the encoded video bitstream 204.

In embodiments, the streaming server 205 may also function as a Media-Aware Network Element (MANE). For example, the streaming server 205 may be configured to prune the encoded video bitstream 204 for tailoring potentially different bitstreams to one or more of the streaming clients 206. In embodiments, a MANE may be separately provided from the streaming server 205 in the streaming system 200.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
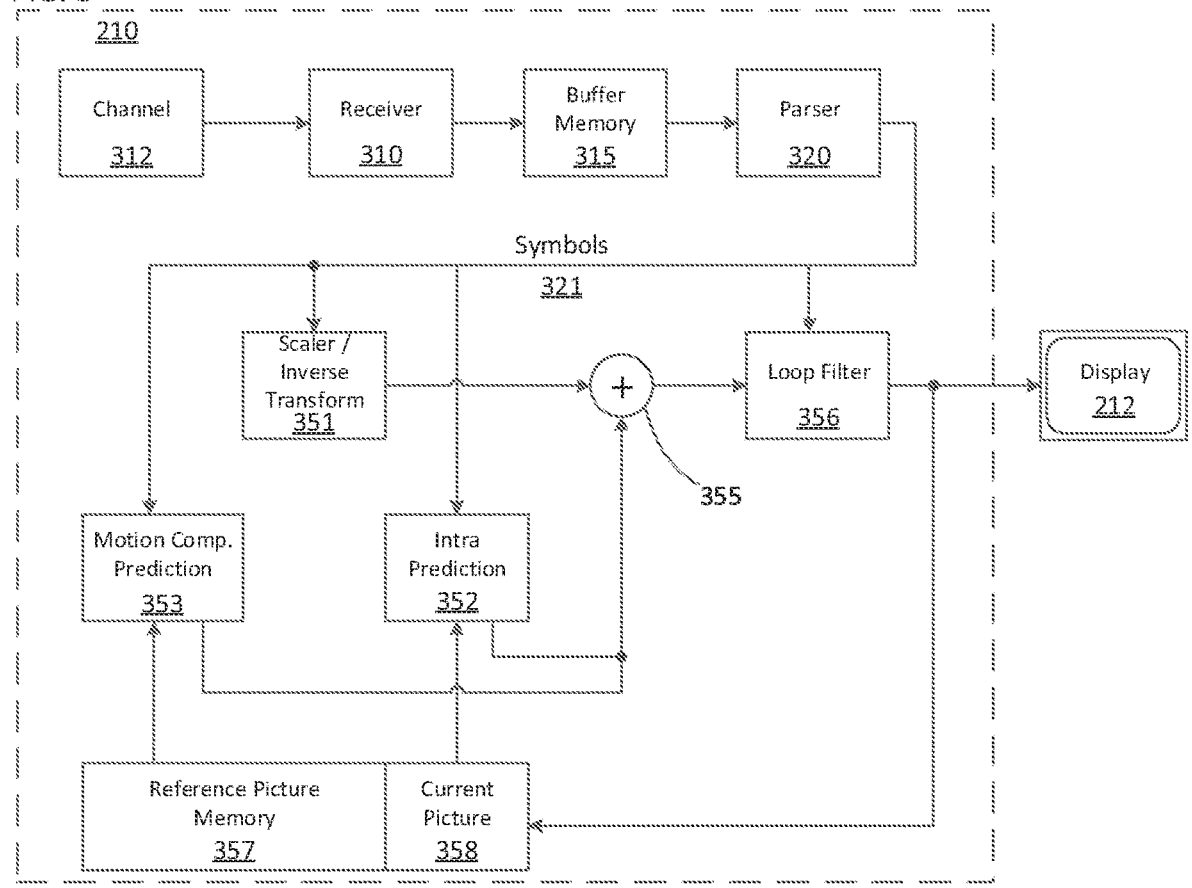
FIG. 3 is a schematic illustration of a simplified block diagram of a decoder in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra picture prediction unit 352, a Motion Compensation Prediction unit 353, an aggregator 355, a loop filter unit 356, reference picture memory 357, and current picture memory. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer memory 315 may not be used, or can be small. For use on best effort packet networks such as the Internet, the buffer memory 315 may be required, can be comparatively large, and can be of adaptive size.

The video decoder 210 may include a parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer memory 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks including sample values that can be input into the aggregator 355.

In some cases, the output samples of the scaler/inverse transform unit 351 can pertain to an intra coded block; that is: a block that is not using predictive information from previously reconstructed pictures, but can use predictive information from previously reconstructed parts of the current picture. Such predictive information can be provided by an intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra picture prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from which the Motion Compensation Prediction unit 353 fetches prediction samples, can be controlled by motion vectors. The motion vectors may be available to the Motion Compensation Prediction unit 353 in the form of symbols 321 that can have, for example, X, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
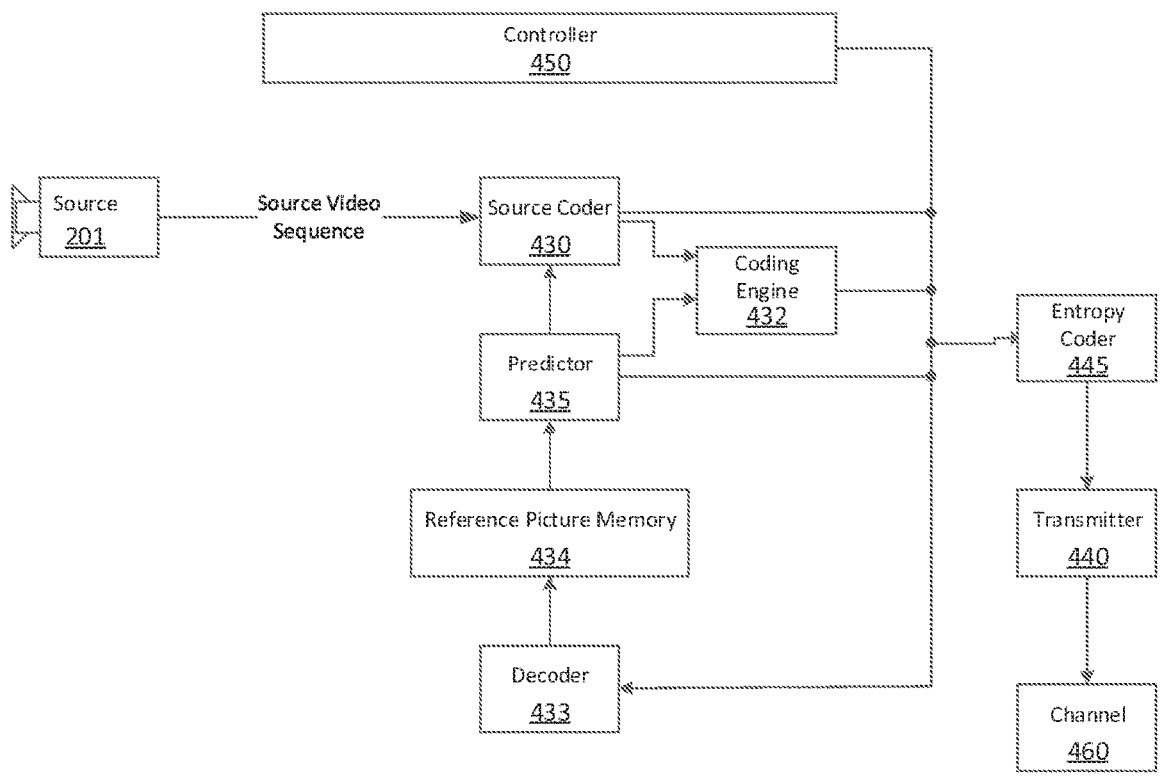
FIG. 4 is a schematic illustration of a simplified block diagram of an encoder in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 43, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 201 may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder 203 may code and compress the pictures of the source video sequence into a coded video sequence 443 in real time or under any other time constraints as required by the application. Enforcing appropriate coding speed is one function of controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder 203 optimized for a certain system design.

Some video encoders operate in what a person skilled in the are readily recognizes as a "coding loop". As an over-simplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer memory 315, and parser 320 may not be fully implemented in the local decoder 433.

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local decoder 433 may decode coded video data of frames that may be designated as reference frames, based on symbols created by the source coder 430. Operations of the coding engine 432 may advantageously be lossy processes. When the coded video data may be decoded at a video decoder (not shown in FIG. 4), the reconstructed video sequence typically may be a replica of the source video sequence with some errors. The local decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the source coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence (s) as created by the entropy coder 445 to prepare it for transmission via a communication channel 460, which may be a hardware/software link to a storage device which would store the encoded video data. The transmitter 440 may merge coded video data from the source coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video encoder 203 may perform coding operations according to a predetermined video coding technology or standard, such as ITU-T Rec. H.265. In its operation, the video encoder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The source coder 430 may include such data as part of the coded video sequence. Additional data may include temporal/spatial/SNR enhancement layers, other forms of redundant data such as redundant pictures and slices, Supplementary Enhancement Information (SEI) messages, Visual Usability Information (VUI) parameter set fragments, and so on.

[Context-Adaptive Arithmetic Coding Engine in HEVC and VVC]

A context-adaptive arithmetic coding (CABAC) engine in HEVC and VVC may use a table-based probability transition process between 64 different representative probability states. In HEVC, the range ivlCurrRange representing the state of the coding engine may be quantized to a set of four values prior to the calculation of the new interval range. The HEVC state transition may be implemented using a table containing all 64×4 8-bit pre-computed values to approximate the values of ivlCurrRange*pLPS(pStateIdx), where pLPS is the probability of the least probable symbol (LPS) and pStateIdx is the index of the current state. Also, a decode decision may be implemented using a pre-computed look-up table (LUT). First, ivlLpsRange may be obtained using the LUT as shown below in EQUATION 1. Then, ivlLpsRange may be used to update ivlCurrRange and calculate the output binVal.

$$\text{ivlLpsRange}=\text{rangeTabLps}[\text{pStateIdx}][\text{qRangeIdx}] \quad \text{(EQUATION 1)}$$

In VVC, the probability may be linearly expressed by the probability index pStateIdx. Therefore, all of the calculations may be done with equations without the LUT operation. To improve the accuracy of probability estimation, a multi-hypothesis probability update model may be applied. The pStateIdx used in the interval subdivision in the binary arithmetic coder may be a combination of two probabilities pStateIdx0 and pStateIdx1. The two probabilities may be associated with each context model and may be updated independently with different adaptation rates. The adaptation rates of pStateIdx0 and pStateIdx1 for each context model may be pre-trained based on the statistics of the associated bins. The probability estimate pStateIdx may be the average of the estimates from the two hypotheses.

Figure 5:
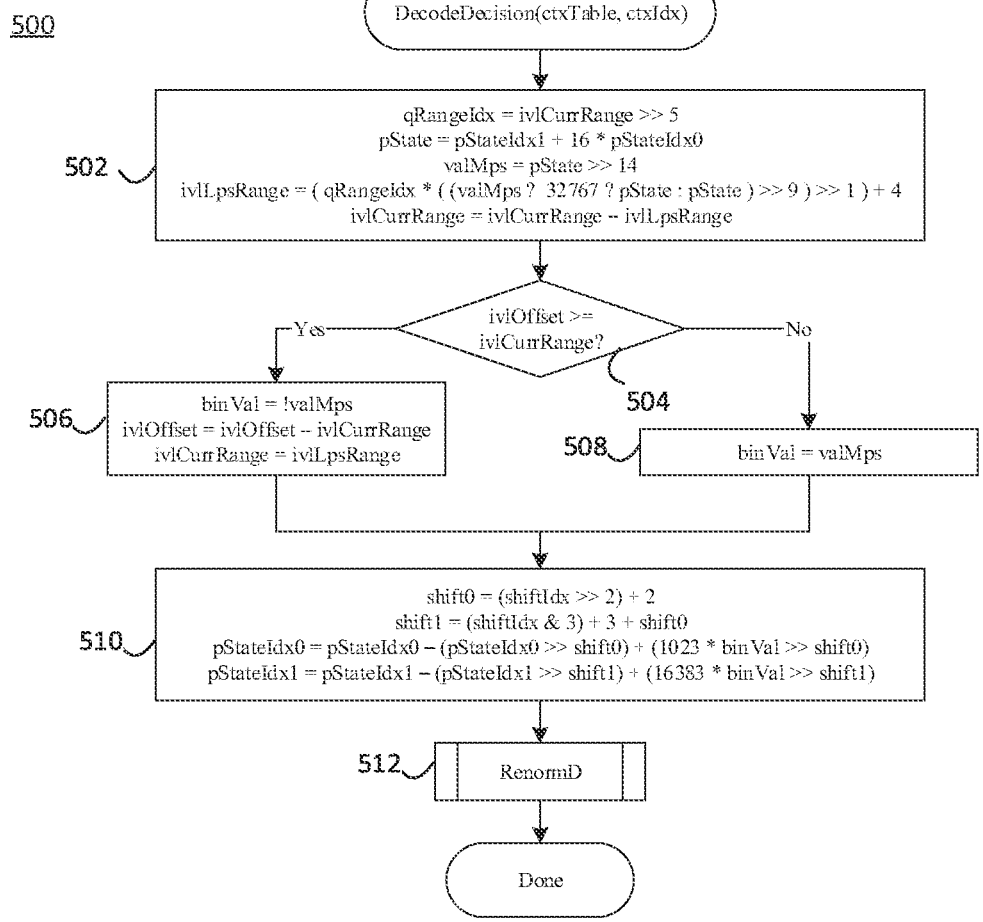
FIG. 5 is an example flow chart of a process for decoding a bin in accordance with an embodiment.

FIG. 5 illustrates an embodiment of a process (500) for decoding a single binary decision. The process 500 may start at an operation 502 to determine a value for the variable ivlCurrRange. At an operation 504, if the variable ivlCurrRange is less than or equal to the variable ivlOffset, the process proceeds to an operation 506 to update the values of the variables binVal, ivlOffset, and ivlCurrRange. If the variable ivlCurrRange is not less than the value of the variable ivlOffset, the process proceeds to an operation 508 to update the value of the variable binVal. The process proceeds from either the operation 506 or the operation 508 to the operation 510 to update the variables pStateIdx0 and pStateIdx1. The process proceeds to an operation 512 to perform the RenormD process.

As performed in HEVC, VVC CABAC may also have a quantization parameter (QP) dependent initialization process invoked at the beginning of each slice. Given the initial value of luma QP for the slice, the initial probability state of a context model, denoted as preCtxState, may be derived as shown below in EQUATIONS 2-4:

$$m=\text{slopeIdx}\times 5-45 \quad \text{(EQUATION 2)}$$

$$n=(\text{offsetIdx}<<3)+7 \quad \text{(EQUATION 3)}$$

$$\text{preCtxState}=\text{Clip3}(1,127,((m\times(\text{QP}-32))>>4)+n) \quad \text{(EQUATION 4)}$$

where slopeIdx and offsetIdx may be restricted to 3 bits, and total initialization values may be represented by 6-bit precision. The probability state preCtxState may represent the probability in the linear domain directly. Hence, with reference to EQUATIONS 5-6 below, preCtxState may only need proper shifting operations before input to an arithmetic coding engine, and the logarithmic to linear domain mapping as well as the 256-byte table is saved.

$$\text{pStateIdx0}=\text{preCtxState}<<3 \quad \text{(EQUATION 5)}$$

$$\text{pStateIdx1}=\text{preCtxState}<<7 \quad \text{(EQUATION 6)}$$

[Multi-Symbol Arithmetic Coding in AV1]

In AV1, an M-ary arithmetic coding engine may be used for entropy coding the syntax elements. Each syntax element may be associated with an alphabet of M elements, where M can be any integer value between 2 and 16. The input to the encoding may be an M-ary symbol, and a coding context that may include a set of M probabilities, represented by a cumulative distribution function (CDF). The probabilities may be updated after coding/parsing each syntax element. The cumulative distribution functions may be arrays of M 15-bit integers as shown below in EQUATION 7:

$$C=[c_0,c_1,\ldots,c_{(M-2)},2^{15}] \quad \text{(EQUATION 7)}$$

where $c_n/32768$ is the probability of the symbol being less than or equal to n.

The probability update may be performed using the below EQUATIONS 8:

$$\begin{cases} c_m = c_m \cdot (1-\alpha) & m \in [0, \text{symbol}) \\ c_m = c_m + \alpha \cdot (1-c_m) & m \in [\text{symbol}, M-1) \end{cases} \quad \text{(EQUATIONS 8)}$$

where α is the probability update rate that adapts based on the number of times the symbol has been decoded (e.g., up to a maximum of 32) and m is the index of the element in the CDF.

This adaptation of α allows faster probability updates at the beginning of coding/parsing the syntax elements. The M-ary arithmetic coding process may follow the conventional arithmetic coding engine design. However, only the most significant 9 bits of the 15-bit probability values may be input to the arithmetic encoder/decoder. The probability update rate α associated with a symbol may be calculated based on the number of appearances for the associated symbol when parsing a bitstream and the value of a may be reset using the below EQUATION 9 at the beginning of a frame or a tile:

$$\alpha = \frac{1}{2^{3+(count>15)+(count>32)+min(log_2(M),2)}} \quad \text{(EQUATION 9)}$$

From EQUATION 9, the probability update rate has a greater value at the beginning and then saturates after 32 appearances happened.

[Multi-Hypothesis Arithmetic Coding]

A multi-hypothesis probability model for encoding an M-ary symbol may be provided. For example, a method may include modifications to the AV1 arithmetic coding engine relating to multi-hypothesis estimation. For example, AV1 uses a data adaptive model for probability update, wherein the update rate is higher with fewer occurrences of a syntax element and is lower with more observations. However, only a single probability model is used by the engine. A multi-hypothesis estimation, wherein each syntax element maintains two or more probability tables of different update rates, can bring additional compression efficiency. Thus, a multi-hypothesis probability model may be implemented with the two update rates shown below in EQUATIONS 10-11:

$$\alpha_1 = \frac{1}{2^{alpha\_1+(count>15)+(count>31)+min(log_2(M),2)}} \quad \text{(EQUATION 10)}$$

$$\alpha_2 = \frac{1}{2^{alpha\_2+(count>7)+(count>15)+min(log_2(M),2)}} \quad \text{(EQUATION 11)}$$

where $\alpha_2$ models a faster update while $\alpha_1$ models a slower update. The final probability model may be calculated as linear combination of the hypotheses. According to an embodiment, the average of two hypotheses may be used. To adapt to varying symbol statistics across frames/tiles, the alpha_1, alpha_2 may be signaled at frame/tile level.

[Luma Intra Mode Coding]

Figure 6:
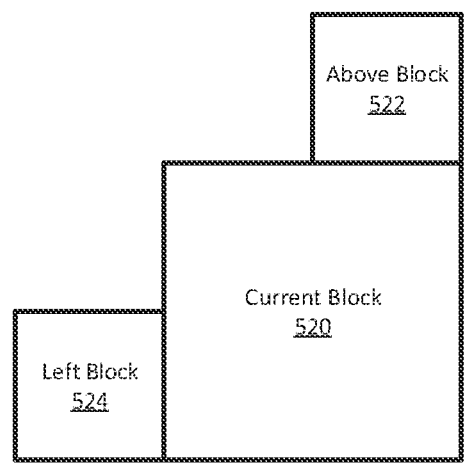
FIG. 6 illustrates neighboring blocks, of a current block, used in luma intra mode coding in accordance with an embodiment.

For luma intra coded blocks, all available intra prediction modes may be re-ordered and inserted into a mode list before signaling, wherein the intra prediction modes of two neighboring blocks may be involved in this re-ordering process. The positions of two neighboring blocks are shown in FIG. 6. In particular, FIG. 6 illustrates a current block 520, and an above block 522 and a left block 524 that are neighboring blocks of the current block 520.

Specially, this re-ordering process may be defined in the following three steps: (1) Always firstly place DC, SMOOTH, SMOOTH_V, SMOOTH_H, PAETH mode into the mode list; (2) for each directional intra prediction mode in neighboring blocks, derive nine modes by adding offset [0, −1, +1, −2, +2, −3, +3, −4, +4] to the directional modes, and add them into the mode list if they have not been added yet; and (3) insert the pre-defined default modes into the mode list if the mode list is not full.

After the above re-ordering process, the intra prediction modes may be split into five mode sets based on the mode index. The number of the modes in each mode set may be 5, 8, 16, 16, and 16. TABLE 1, below, illustrates the mapping between re-ordered mode indexes and the associated mode set index.

TABLE 1

Mapping between mode index and mode set index.

| Re-ordered mode index | Mode set index |
|---|---|
| 0~4 | 0 |
| 5~12 | 1 |
| 13~28 | 2 |
| 29~44 | 3 |
| 45~60 | 4 |

To signal the intra prediction modes, a first syntax may be signaled to indicate the mode set index of the intra prediction mode, and a second syntax may be signaled to indicate the mode index in the mode set.

According to embodiments, delta angles may be allowed only when the block size is equal to or greater than 8×8 in AV1, whereas delta angles may be allowed for all block sizes in AI Music Creativity (AIMC). According to embodiments, for vertical and horizontal modes, offset-based intra prediction refinement (ORIP) may be always enabled for zero reference lines and disabled for nonzero reference lines.

[Chroma Intra Mode Coding]

Since the texture in a chroma component is usually smoother than a luma component, for each chroma block, 14 intra prediction modes may be adaptively selected and included in only one intra mode set.

Specifically, the following aspects may be included in embodiments:

(1) The context for signaling chroma mode coding may depend on whether the mode set index of co-located luma mode is zero or not.

(2) Chroma nominal modes may be re-ordered based on the co-located luma intra prediction mode. Chroma from luma (CfL) mode may be firstly added into the chroma intra mode list. The nominal mode of co-located luma intra prediction mode may be added into the mode list if it is a directional intra prediction mode. The remaining 12 nominal modes may be added into the mode list according to the following order [DC, SMOOTH, SMOOTH_V, SMOOTH_H, PAETH, VERTICAL, HORIZONTAL, D45_PRED, D67_PRED, D113_PRED, D135_PRED, D157_PRED, D203_PRED].

(3) Delta angles may not be signaled for the chroma component but derived according to the co-located luma mode. Specifically, if chroma intra prediction mode is a directional mode and equal to the intra prediction mode of the co-located luma block, then the delta angle of the chroma block may be set equal to the delta angle of the co-located luma block. Otherwise, the delta angle of the chroma block may be set to zero.

[Chroma Predicted from Luma]

For chroma component, in addition to 56 directional modes and 5 non-directional modes, CfL may be provided. CfL is a chroma-only intra prediction mode, which models chroma pixels as a linear function of coincident reconstructed luma pixels. The CfL prediction may be expressed as shown below in EQUATION 12:

$$CfL(\alpha) = \alpha \times L_{AC} + DC \quad \text{(EQUATION 12)}$$

wherein $L_{AC}$ denotes the AC contribution of luma component, $\alpha$ denotes the scaling parameter of the linear model, and DC denotes the DC contribution of the chroma component.

Figure 7:
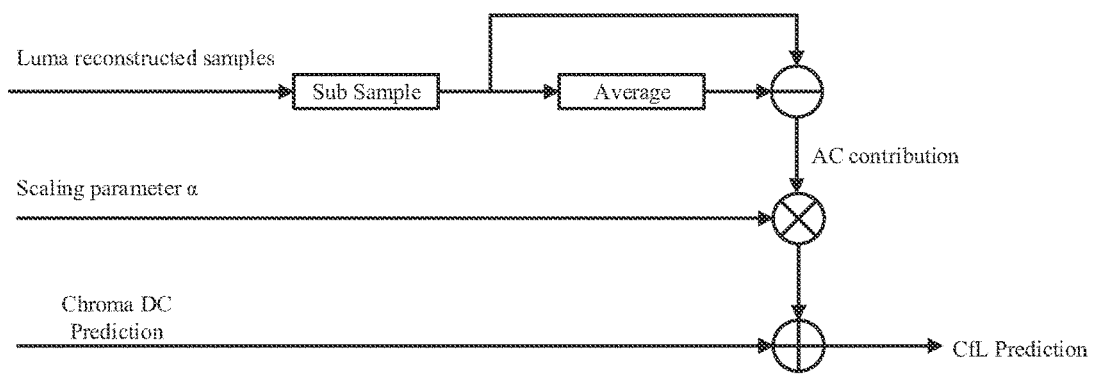
FIG. 7 is a schematic illustration of a chroma from luma (CfL) prediction process.

FIG. 7 is a schematic illustration of the CfL prediction process 530. With reference to FIG. 7 and Equation 12, the reconstructed luma pixels may be subsampled into the chroma resolution, and then the average value may be subtracted to form the AC contribution. To approximate the chroma AC component from the AC contribution, instead of requiring the decoder to calculate the scaling parameters as in some background art, AV1 CfL may determine the scaling parameter a based on the original chroma pixels and signal them in the bitstream. This reduces decoder complexity and yields more precise predictions. The DC contribution of the chroma component may be computed using intra DC mode, which is sufficient for most chroma content and has mature fast implementations.

When the CfL mode is chosen, the joint sign of scaling factors for U and V components may be firstly signaled. A sign for one scaling factor may be either negative, zero, or positive. In addition, the combination of (zero, zero) may not be allowed in CfL mode because it results in "DC" prediction. Therefore, the combination of the sign for two scaling factors may have 8 (3*3−1=8) combinations in total. As a result, the joint sign may require an eight-value symbol. Only one context may be employed to signal the joint sign.

Regarding to the signaling for the magnitude of scaling parameter, a 16-value symbol may be used to represent values ranging from 0 to 2 with a step of $\frac{1}{8}^{th}$. A 16-value symbol fully utilizes the capabilities of the multi-symbol entropy encoder. The context for signaling the scaling parameter depends on the value of joint sign.

[Motion Vector Difference Coding in AV1]

AV1 allows ⅛ pixel motion vector precision (or accuracy), and the following syntax elements may be used to signal the motion vector difference in reference frame list 0 or list 1.

The syntax element mv_joint may specify which components of the motion vector difference are non-zero. For example, a value of 0 may indicate that there is no non-zero MVD along either the horizontal or vertical direction; a value of 1 may indicate that there is a non-zero MVD only along the horizontal direction; 2 may indicate that there is non-zero MVD only along vertical direction; a value of 3 may indicate that there is non-zero MVD along both the horizontal and vertical direction.

The syntax element mv_sign may specify whether the motion vector difference is positive or negative.

The syntax element mv_class may specify the class of the motion vector difference. As shown below in TABLE 2, a higher class may mean that the motion vector difference has a larger magnitude.

TABLE 2

Magnitude class for motion vector difference

| MV class | Magnitude of MVD |
|---|---|
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

The syntax element mv_bit may specify the integer part of the offset between motion vector difference and starting magnitude of each MV class.

The syntax element mv_fr may specify the first 2 fractional bits of the motion vector difference.

The syntax element mv_hp may specify the third fractional bit of the motion vector difference.

[Problem of Multi-Symbol Arithmetic Coding in AV1]

With respect to multi-symbol arithmetic coding in AV1, the M-ary arithmetic coding engine used in AV1 can support syntax elements that have an alphabet size of M elements, where M can be any integer value between 2 and 16. In hardware, the arithmetic coding engine should be able to handle the worst-case scenario (alphabet size of 16), resulting in increased chip area and reduced throughput.

Example Embodiments

Embodiments of the present disclosure may be used separately or combined in any order. Further, each of the embodiments of the present disclosure (e.g., methods, encoder, and decoder) may be implemented by processing circuitry (e.g., one or more processors or one or more integrated circuits). In one example, the one or more processors execute a program that is stored in a non-transitory computer-readable medium.

Embodiments of the present disclosure may reduce complexity of the arithmetic coding engine by supporting a reduced alphabet size N (a N-ary arithmetic coding engine), where N<=M. To this end, all entropy coded syntax elements may be required to have an alphabet size <=N.

Embodiments of the present disclosure may set the max alphabet size to be less than a hardware imposed constraint.

Embodiments of the present disclosure may limit the alphabet size of an entropy coded syntax element to be less than or equal to N.

According to embodiments, N can be any integer value between 2 and 16, such as 2, 4, or 8.

According to embodiments, the syntax element mv_class defined in AV1 may have an alphabet size of 11. According to embodiments, mv_class may specify the class of the motion vector difference. If N is less than 16 (e.g., 4 or 8), new syntax elements mv_class_set and mv_class_idx may be defined to replace mv_class, wherein the alphabet size of mv_class_set and mv_class_idx may be less than or equal to N. This may be done by grouping the symbols of mv_class to multiple sets, and providing an index (e.g., mv_class_set) for each symbol in the set. According to embodiments, another index (e.g., mv_class_idx) may be provided/signaled to indicate which candidate in a selected set is being used for encoding and decoding. According to embodiments, an encoder may perform the above functions (e.g., defining syntax elements to replace mv_class based on the value of N, grouping symbols of mv_class to multiple sets, and providing an index for each symbol in the set), entropy encode the syntax elements to obtain a coded bitstream, and send the coded bitstream to a decoder. According to embodiments, a decoder may receive the coded bitstream sent by the encoder, obtain the syntax elements (and their symbols) from the coded bitstream (e.g., by entropy decoding), and decode video data of the coded bitstream based on the syntax elements.

According to one or more embodiments, the alphabet size of mv_class_set is set (e.g., by the encoder) to 2, and the number of grouped MV classes in each mv_class_set is 3 and 8, respectively.

According to one or more embodiments, the alphabet size of mv_class_set is set (e.g., by the encoder) to 3, and the number of grouped MV classes in each mv_class_set is 3, 4, and 4, respectively.

According to embodiments, syntax elements cfl_alpha_u and cfl_alpha_v defined in AV1 has an alphabet size of 16. The syntax element cfl_alpha_u may contain the absolute value of alpha minus one for the U component, and the syntax element cfl_alpha_v may contain the absolute value of alpha minus one for the V component. According to embodiments, "alpha" may be a scaling parameter for the CfL mode (e.g., α in EQUATION 12). If N is less than 16, e.g., 4 or 8, new syntax element cfl_alpha_u_set and cfl_alpha_u_idx may be defined to replace cfl_alpha_u, and new syntax elements cfl_alpha_v_set and cfl_alpha_v_idx may be defined to replace cfl_alpha_v, wherein the alphabet size of each of the new syntax elements is less than or equal to N. According to embodiments, an encoder may perform the above functions (e.g., defining syntax elements to replace cfl_alpha_u and cfl_alpha_v based on the value of N, and send the coded bitstream to a decoder. According to embodiments, a decoder may receive the coded bitstream sent by the encoder, obtain the syntax elements (and their symbols) from the coded bitstream (e.g., by entropy decoding), and decode video data of the coded bitstream based on the syntax elements.

According to one or more embodiments, candidate CfL alpha values may be grouped into different sets (i.e., CfL alpha value sets), a set index (e.g., cfl_alpha_u_set, cfl_alpha_v_set) may be signaled to indicate which set a selected CfL alpha value belongs to, and another index (e.g., cfl_alpha_u_idx and cfl_alpha_v_idx) may be signaled to indicate which candidate in a selected set is being used for encoding and decoding. According to embodiments, an encoder may perform the above functions (e.g., defining syntax elements to replace cfl_alpha_u and cfl_alpha_v based on the value of N, grouping candidate CfL alpha values to multiple sets, entropy encode the syntax elements to obtain a coded bitstream, and send the coded bitstream to a decoder. According to embodiments, a decoder may receive the coded bitstream sent by the encoder, obtain the syntax elements (and their symbols) from the coded bitstream (e.g., by entropy decoding), and decode video data of the coded bitstream based on the syntax elements.

According to an embodiment, the candidate CfL alpha values in one or multiples of the CfL alpha value sets are pre-defined.

According to an embodiment, the candidate CfL alpha values in one or multiples of the CfL alpha value sets are determined (e.g., by the encoder or the decoder) by coded information, including but not limited, neighboring reconstructed sample values of luma and chroma, alpha values used in neighboring blocks, and block size/shape. In one example, one or multiple CfL alpha value sets defines a set of most probable CfL alpha values.

According to an embodiment, the candidate CfL alpha values in one or multiples of the CfL alpha value sets are determined (e.g., by the encoder or the decoder) based on the associated alpha value. For example, when there are two sets, one set may be set to include all CfL alpha values less than a threshold, and the remaining CfL alpha values may be included in the other set. According to embodiments, the encoder and/or decoder may perform the above functions.

According to an embodiment, the set index (e.g., cfl_alpha_u_set, cfl_alpha_v_set) is context coded.

According to an embodiment, the index specifying which candidate in the selected set is being used (e.g., cfl_alpha_u_idx and cfl_alpha_v_idx) is coded without any context (i.e., bypass coded or coded with fixed probability).

According to an embodiment, the set index(es) may be decided based on coded information, such as a previous CfL mode set index, or neighboring sample's luma and chroma reconstructed pixels. In this case, the set index may be implicitly signaled. According to embodiments, the encoder and/or decoder may determine the set index(es).

According to one or more embodiments, the alphabet size of cfl_alpha_u_set (and cfl_alpha_v_set) is set (e.g., by the encoder) to 2 (or 4), and the number of candidate CfL alpha values in each set is 8 or 4.

According to embodiments, syntax elements mode_set_index & mode_idx associated with luma intra mode coding has an alphabet size <=N.

According to one or more embodiments, the value of mode_set_index is set (e.g., by the encoder) to 8. The number of modes in the first set is set (e.g., by the encoder) to 5, and the number of modes in the other sets are set (e.g., by the encoder) to 8.

According to embodiments, syntax elements uv_mode_set_index and uv_mode_idx associated with chroma intra mode coding has an alphabet size <=N.

According to one or more embodiments, the value of uv_mode_set_index is set (e.g., by the encoder) to 2, and the number of mode in the first set is set (e.g., by the encoder) to 6, and the modes in the second set is set (e.g., by the encoder) to 8.

According to embodiments, when signaling a wedgelet pattern index (i.e., wedge_idx), all the possible wedgelet patterns may be grouped into different sets, and the number of candidate wedgelet patterns in each set may be less than or equal to N.

According to one or more embodiments, a first syntax element wedgelet_set may be signaled to indicate which set of the wedgelet patterns (i.e. wedgelet pattern set) is the selected wedgelet pattern coming from.

According to one or more embodiments, a second syntax wedgelet_idx may be signaled to indicate which candidate of the selected wedgelet pattern set is selected for encoding and decoding.

According to one or more embodiments, one or multiples of the wedgelet pattern set is generated (e.g., by the encoder or decoder) based on coded information, including but not limited, neighboring reconstructed sample values, wedgelet pattern used in neighboring blocks, and block size/shape.

According to an embodiment, one or multiple wedgelet pattern set defines a set of most probable wedgelet patterns.

According embodiments, when the number of samples in a residual block is greater than a threshold T, then an eob value is signaled using multiple syntax elements. The syntax element eob may be a variable that indicates the index of the end of the block. According to embodiments, an encoder may determine whether the number of samples in the residual block is greater than the threshold T and, based on determining that the number of samples in the residual block is greater than the threshold T, signal the eob value in the coded bitstream by using multiple syntax elements.

According to one or more embodiments, the value of T is equal to $2^{(N-1)}$.

According to one or more embodiments, the eob value range is first classified into different groups, and the group index, namely eob_group_idx, is first signaled (e.g., in the coded bitstream), then the selected entry of the selected group is further signaled (e.g., in the coded bitstream) to indicate the eob value. According to embodiments, an encoder may perform the above functions. According to embodiments, a decoder may receive the coded bitstream sent by the encoder, obtain the syntax elements from the coded bitstream (e.g., by entropy decoding), and decode video data of the coded bitstream based on the syntax elements.

According to embodiments, at least one processor and memory storing computer program instructions (i.e. computer code) may be provided. The computer program instructions, when executed by the at least one processor, may implement an encoder or a decoder and may perform any number of the functions described in the present disclosure, including the functions performed by the encoder or the decoder.

Figure 8:
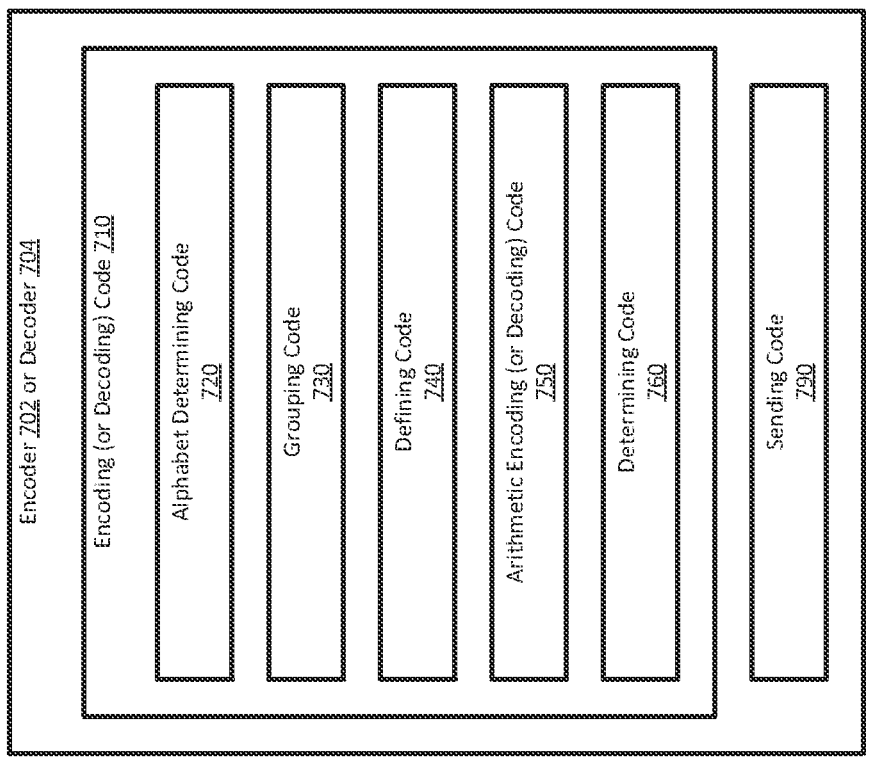
FIG. 8 is a block diagram of computer code in accordance with an embodiment.

For example, with reference to FIG. 8, the at least one processor may implement an encoder 702 or a decoder 704. The computer program instructions may include, for example, encoding (or decoding) code 710 that is configured to cause the at least one processor to code (or decode) at least one picture that is received in accordance with embodiments of the present disclosure. The encoding (or decoding) code 710 may include, for example, alphabet determining code 720, grouping code 730, defining code 740, arithmetic encoding (or decoding) code 750, determining code 760, and sending code 790. While example code that causes certain functions to be performed is described herein, it will be understood that embodiments of the present disclosure may include other code to perform any other functions described in the present disclosure.

The alphabet determining code 720 may be configured to cause the at least one processor to determine a maximum alphabet size for arithmetic encoding (and/or decoding), in accordance with embodiments of the present disclosure. For example, the alphabet determine code 720 may be configured to cause the at least one processor to determine a first maximum alphabet size for arithmetic coding by an arithmetic coding engine, the first maximum alphabet size determined based on a hardware constraint; and determine a second maximum alphabet size, based on the first maximum alphabet size, to be less than the first maximum alphabet size.

The grouping code 730 may be configured to cause the at least one processor to group symbols related to video coding into sets. According to embodiments, the grouping may occur based on determining the maximum alphabet size is less than or equal to a predetermined value. For example, the symbols may be classes of a motion vector difference, an indication of an absolute value of a scaling parameter for CfL mode, a mode of luma intra mode coding, a mode of chroma intra mode coding, a wedgelet pattern, or an eob value. According to embodiments, the grouping may group symbols of a syntax element (e.g., mv_class, cfl_alpha_u, and cfl_alpha_v) to replace the syntax element.

The defining code 740 may be configured to cause the at least one processor to define syntax elements related to the symbols, in accordance with embodiments of the present disclosure. According to embodiments, the defining may occur based on determining the maximum alphabet size is less than or equal to the predetermined value. According to embodiments, the new syntax elements that are defined may replace the syntax element.

The arithmetic encoding (or decoding) code 720 may be configured to cause the at least one processor to arithmetic encode the syntax elements to obtain a coded video stream or arithmetic decode the syntax elements, in accordance with embodiments of the present disclosure. For example, the syntax elements may be encoded (or decoded) based on the determined second maximum alphabet size, wherein each of the plurality of syntax elements is entropy coded (or decoded) with an alphabet size less than or equal to the determined second maximum alphabet size.

The determining code 760 may be configured to cause the at least one processor to determine the sets, the symbols in one or more of the sets, and/or indexes based on information (e.g., coded information), in accordance with embodiments of the present disclosure.

When the encoder 702 is provided, the computer program instructions may further include, for example, sending code 790 that may be configured to cause the at least one processor to send a bitstream, including the picture(s) that is coded, to a decoder (e.g., the decoder 704) in accordance with embodiments of the present disclosure. The encoder 702 may provide information (e.g., syntax elements and their symbols) in the bitstream, such as the information described in the present disclosure, in accordance with embodiments of the present disclosure.

The techniques of embodiments of the present disclosure described above, can be implemented as computer software using computer-readable instructions and physically stored in one or more computer-readable media. For example, FIG. 9 shows a computer system 900 suitable for implementing embodiments of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
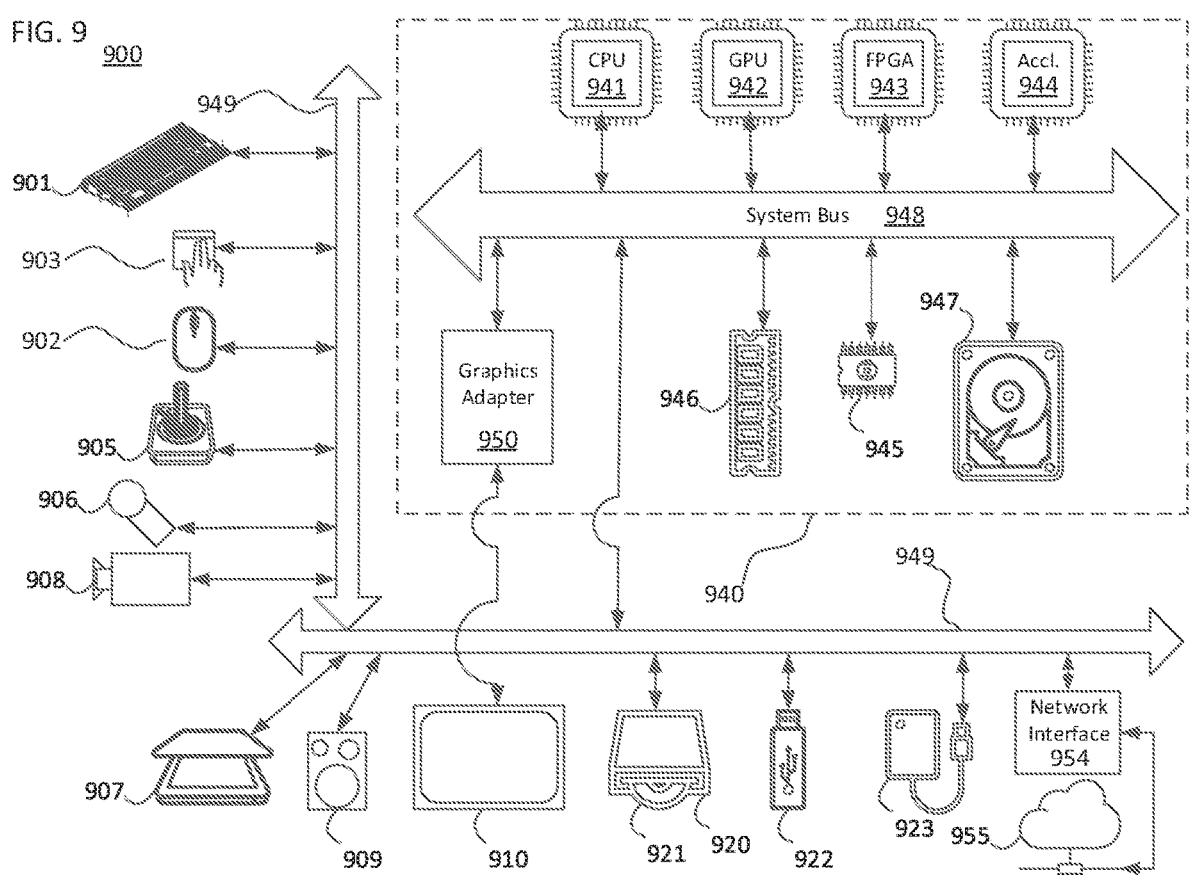
FIG. 9 is a diagram of a computer system suitable for implementing embodiments of the present disclosure.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by a decoder, the method comprising:
   receiving a coded video bitstream including a plurality of syntax elements;
   determining a limit to an alphabet size for arithmetic coding by an arithmetic coding engine, the limit being determined as less than or equal to N where N is an integer value, and determining the limit comprises replacing a syntax element, of the syntax elements, depending on determining that N is less than 16;

decoding the plurality of syntax elements included in the coded video bitstream, based on the limit and the alphabet size, wherein each of the plurality of syntax elements is entropy coded with an alphabet size less than or equal to the limit.

2. The method of claim 1, wherein the integer value is between 2 and 16.

3. The method of claim 2, wherein the integer value is any of 2, 4, and 8.

4. The method of claim 1, wherein the syntax element is a syntax element mv_class, and determining the limit comprises replacing the syntax element mv_class depending on determining that N is less than 16.

5. The method of claim 4, wherein replacing the syntax element mv_class comprises replacing the syntax element mv_class with mv_class_set and mv_class_idx.

6. The method of claim 5, wherein replacing the syntax element mv_class with mv_class_set and mv_class_idx comprises grouping symbols of mv_class to multiple sets with an index used for each symbol per set.

7. The method of claim 6, wherein replacing the syntax element mv_class with mv_class_set and mv_class_idx comprises at least one of:

determining an alphabet size of the mv_class_set as set to 2 and a number of 2 grouped MV classes in each of the mv_class_set as 3 and 8 respectively, and determining an alphabet size of the mv_class_set as set to 3 and a number of 3 grouped MV classes in each of the mv_class_set as 3, 4, and 4 respectively.

8. A method performed by an encoder, the method comprising:

receiving a video data; and encoding the video data based on a plurality of syntax element and whether to a limit to an alphabet size for arithmetic coding by an arithmetic coding engine, the limit being determined as less than or equal to N where N is an integer value, and determining the limit comprises replacing a syntax element, of the syntax elements, depending on determining that N is less than 16.

9. The method of claim 8, wherein the integer value is between 2 and 16.

10. The method of claim 9, wherein the integer value is any of 2, 4, and 8.

11. The method of claim 8, wherein the syntax element is a syntax element mv_class, and determining the limit comprises replacing the syntax element mv_class depending on determining that N is less than 16.

12. The method of claim 11, wherein replacing the syntax element mv_class comprises replacing the syntax element mv_class with mv_class_set and mv_class_idx.

13. The method of claim 12, wherein replacing the syntax element mv_class with mv_class_set and mv_class_idx comprises grouping symbols of mv_class to multiple sets with an index used for each symbol per set.

14. The method of claim 13, wherein replacing the syntax element mv_class with mv_class_set and mv_class_idx comprises at least one of:

determining an alphabet size of the mv_class_set as set to 2 and a number of 2 grouped MV classes in each of the mv_class_set as 3 and 8 respectively, and determining an alphabet size of the mv_class_set as set to 3 and a number of 3 grouped MV classes in each of the mv_class_set as 3, 4, and 4 respectively.

15. A method of processing visual media data, the method comprising:

performing a conversion between a visual media file and a bitstream of a visual media data according to a format rule, the format rule indicating that the bitstream comprises a plurality of syntax elements and to implement:

determining a limit on an alphabet size for arithmetic coding by an arithmetic coding engine, limit being determined as less than or equal to N where N is an integer value, and determining the limit comprises replacing a syntax element, of the syntax elements, depending on determining that N is less than 16.

16. The method of claim 15, wherein the integer value is between 2 and 16.

17. The method of claim 16, wherein the integer value is any of 2, 4, and 8.

18. The method of claim 15, wherein the syntax element is a syntax element mv_class, and determining the limit comprises replacing the syntax element mv_class depending on determining that N is less than 16.

19. The method of claim 18, wherein replacing the syntax element mv_class comprises replacing the syntax element mv_class with mv_class_set and mv_class_idx.

20. The method of claim 19, wherein replacing the syntax element mv_class with mv_class_set and mv_class_idx comprises grouping symbols of mv_class to multiple sets with an index used for each symbol per set, and wherein replacing the syntax element mv_class with mv_class_set and mv_class_idx comprises at least one of:

determining an alphabet size of the mv_class_set as set to 2 and a number of 2 grouped MV classes in each of the mv_class_set as 3 and 8 respectively, and determining an alphabet size of the mv_class_set as set to 3 and a number of 3 grouped MV classes in each of the mv_class_set as 3, 4, and 4 respectively.

* * * * *